Dec. 5, 1967 W. L. MILLER Re. 26,320

NON-SPILL VENTED CLOSURE FOR HOT CUPS

Original Filed April 10, 1961 2 Sheets-Sheet 1

INVENTOR
WILLIAM L. MILLER

BY
Mason, Porter, Miller & Stewart
ATTORNEYS

NON-SPILL VENTED CLOSURE FOR HOT CUPS

Original Filed April 10, 1961 2 Sheets-Sheet 2

INVENTOR
WILLIAM L. MILLER

BY
Mason, Porter, Dillon & Stewart
ATTORNEYS

United States Patent Office

Re. 26,320
Reissued Dec. 5, 1967

26,320

NON-SPILL VENTED CLOSURE FOR HOT CUPS

William L. Miller, Skokie, Ill., assignor to Continental Can Company, Inc., New York, N.Y., a corporation of New York Original No. 3,193,130, dated July 6, 1965, Ser. No. 101,979, Apr. 10, 1961. Application for reissue June 30, 1967, Ser. No. 651,642
10 Claims. (Cl. 220—44)

Matter enclosed in heavy brackets [ ] appears in the original patent but forms no part of this reissue specification; matter printed in italics indicates the additions made by reissue.

The invention relates generally to closures for beverage containers, and more particularly seeks to provide an improved closure for cups in which hot beverages such as coffee are packaged for "carry out" sales.

When a paper cup or other container is filled with a hot beverage, such as coffee or the like, and capped with a lid or closure of paper or plastic or combinations thereof, said lid must be provided with some means through which excess vapor coming off the hot liquid fill can escape to the atmosphere. It is known to provide a small hole or holes in such lids at center portions thereof for this purpose. Such venting means serves the intended function, but, at the same time drops of the liquid contents can ooze through the venting *means* and present a messy appearance at the top of the closure. A purpose of the invention is to provide a novel closure structure wherein provision is made for permitting escape of vapor to the atmosphere while hiding unsightly markings on the closure brought about by liquid seepage, and also preventing objectionable outspilling of liquid.

Another object of the invention is to provide an improved closure of the character stated wherein attaching media are provided by which attachment to a cup or other container may be effected, and floor [.] surrounding bead and cover means are provided cooperating in the provision of a vapor and liquid seepage receiving compartment or chamber, together with vapor egress orificing opening through the floor into the chamber, the cover being disposed to close over and hide any unsightly marking on the floor resulting from liquid seepage into the chamber, and provision also being made for the escape of vapor from the chamber past said cover.

Another object of the invention is to provide an improved closure o fthe character stated wherein the provision for vapor escape from the chamber past the cover is by way of restricted passage about edge portions of the cover means.

Another object of the invention is to provide an improved closure of the character stated wherein the provision for vapor escape from the chamber past the cover is by way of restricted orificing of the cover means.

Another object of the invention is to provide an improved closure of the character stated wherein the cover is a free disk having its peripheral edge supported on shelf means formed on the bead and snapped in place under inwardly directed overlying projections formed on said bead, said bead also having venting clearances formed therein at circumferentially spaced intervals about the cover disk edge.

Another object of the invention is to provide an improved closure of the character stated wherein the orificing in the closure chamber floor is formed in a raised portion of the floor thereby to minimize chances of return seepage into the cup on which the closure is affixed of liquid which previously had seeped from the cup into the closure chamber.

A further object of the invention is to provide an improved closure of the character stated wherein the chamber floor and the overlying cover disk are bonded together at central portions and the peripheral margin of the disk rests in vapor pressure displaceable contact on the chamber defining bead.

A still further object of the invention is to provide an improved closure of the character stated wherein the chamber floor has a venting orifice in an upstanding protuberance spaced downwardly from the overlying cover and defining a surrounding annular well in the chamber between floor, bead and cover, the cover being bonded to the bead and having a venting orifice therein inwardly of said bonding.

With the above and other objects in view that will hereinafter appear, the nature of the invention will be more clearly understood by reference to the following detailed description, the appended claims and the several views illustrated in the accompanying drawings.

Figure 2:
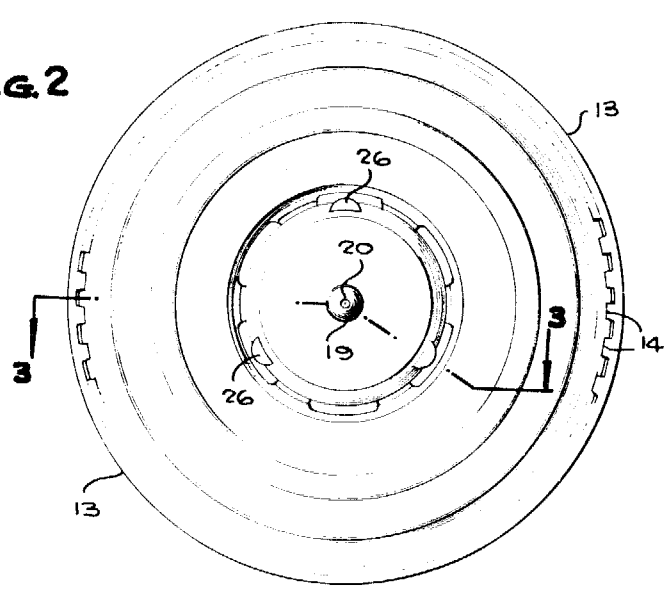
FIGURE 2 is an inverted plan view.
Figure 1:
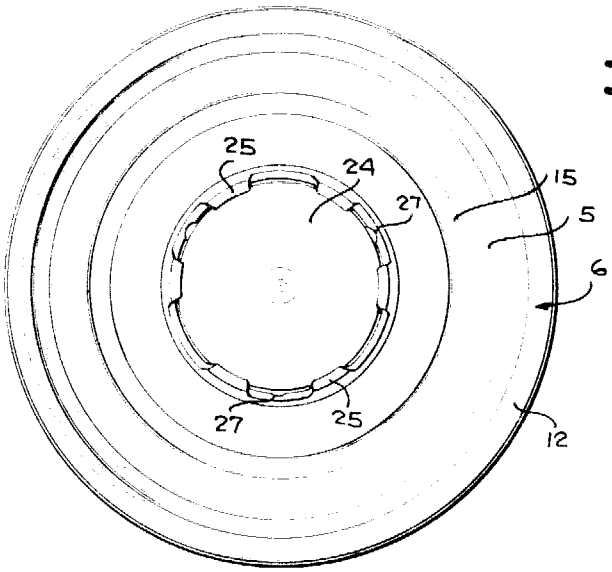
FIGURE 1 is a top plan view illustrating a preferred form of the invention.
Figure 3:
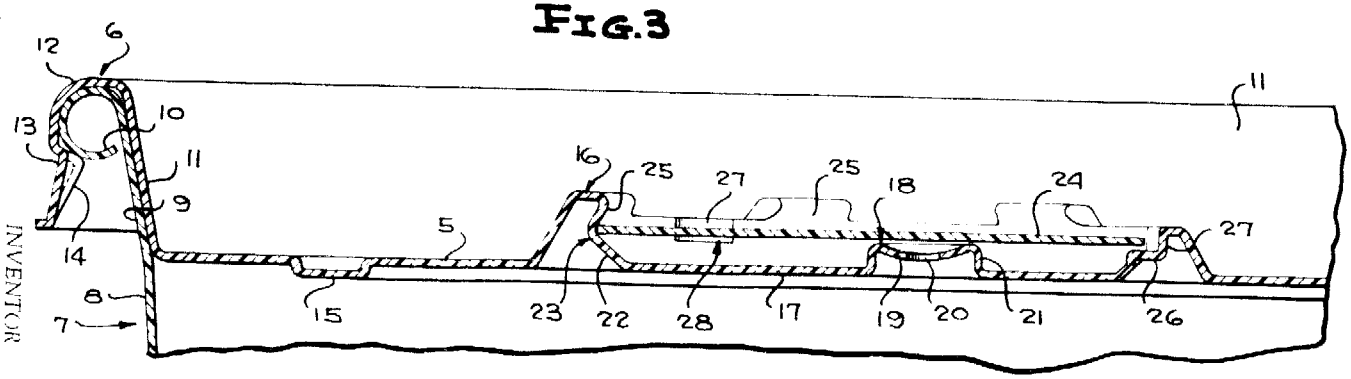
FIGURE 3 is an enlarged fragmentary sectional view taken on the line 3—3 on FIGURE 2.

In the form of the invention illustrated in FIGURES 1 to 3, the improved closure includes a disk-like body 5 having provision at its periphery, as generally indicated at 6, for attachment to a hot cup or other container generally designated 7. It is to be understood that the closure covered herein preferably is *an* all plastic vacuum formed structure, but the same may be formed as a composite of plastic such as polystyrene and paper.

The cup generally designated 7 and in which a hot beverage such as coffee may be packaged for "carry out" sales, in this illustration includes the usualy body wall 8 which is flared as at 9 toward its open mouth defined by the outwardly turned curl 10. While the closure attaching means at the periphery of the closure may take various forms, in the present disclosure the same includes a heel or plug wall portion 11 receivable in the flare of the body as illustrated in FIGURE 2, a channel 12 to receive and embrace the cup mouth curl 10, and an outer skirt portion 13. The skirt is shown as equipped with inwardly projected flexible and deformable detents 14 for yieldably engaging under the curl 10 in a manner for removably securing the closure on the cup as shown in FIGURE 3.

The closure body may be equipped with one or more annular strengthening ribs 15, and it is also formed to include an upstanding annular bead generally designated 16 and which defines therewithin a floor portion 17 preferably including a raised central portion 18 having a dished top 19 equipped with a venting orifice 20. The raised central portion presents an annular dam wall 21.

The floor portion 17 joins the rib 16 through an outwardly and upwardly sloping annulus 22, the juncture of the sloping annulus providing a supporting shelf or groove 23 on which to support the peripheral edge of a cover disk 24, as shown in FIGURE 3. It will be apparent that the disk 24 and the floor portion 17 cooperate in defining a chamber or compartment which is accessible with the interior of a cup or other container on which the closure is mounted through the orifice 20.

The rib or bead 16 also is equipped with a plurality of inwardly directed, circumferentially spaced overhanging detents 25 under which the peripheral edge portion of the flexible disk 24 is snapped and which serve to retain the cover disk in place in the manner illustrated in FIGURE 3. A plurality of circumferentially spaced shelf portions 26 also are formed in the sloping annulus 22, said shelf portions being spaced downwardly from the overlying cover disk margin in the manner illustrated at the right in FIGURE 3, and said shelf portions merge outwardly into upwardly directed indents 27 formed in and spaced circumferentially about the closure bead, said shelf portions 26 and the indents 27 serving to provide for venting of vapors from the chamber between the cover disk 23 and the floor portion 17 and about the peripheral edge of the disk as indicated at 28.

It will be apparent from the foregoing that hot vapors from the hot beverage contained in the cup 7 will be vented through the orificing 20 into the chamber formed between the closure floor portion 17 and the overlying cover disk 24, and such vapors may escape from the chamber about the peripheral edge portion of the disk through the venting passages defined at 26–27, and as indicated at 28. Any seepage of liquid through the orifice 20 will be trapped in the chamber above the floor portion 17, and the cover disk 24 will hide any unsightly appearance of the floor portion 17 which might be brought about by the seepage of liquid into the closure chamber, and it will be apparent that there can be no objectionable outspilling of liquid which may so seep into the chamber.

It will be obvious that the cover disk 24, in addition to hiding any unsightly appearance of the underlying closure floor portion 17, will remain relatively cooler than the main body of the closure which may be directly contacted by hot liquid within the cup or container. Therefore, the vapor, as it escapes into the chamber closure or compartment, comes in contact with the relatively cool cover disk and tends to condense. This reduces the amount of hot vapor to escape to the atmosphere and reduces the possibility of the capper getting a vapor burn on his hand as he places the closure on the container.

Figure 4:
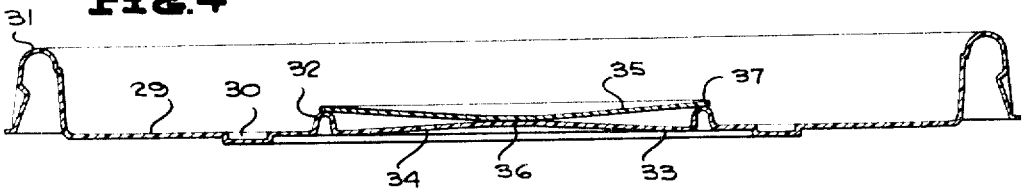
FIGURE 4 is a cross sectional view illustrating a modified form of a closure.
Figure 5:
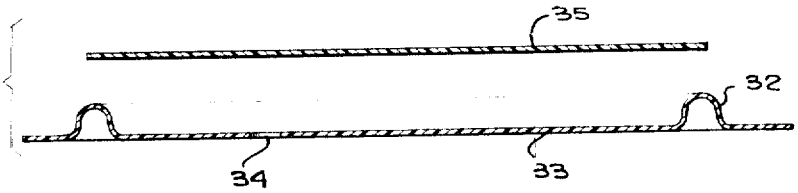
FIGURE 5 is a fragmentary sectional view illustrating the beaded floor portion of the closure body with the cover disk which is to cooperate therewith, the condition of the floor portion and disk prior to attachment thereof one to the other being illustrated.

In the form of the invention illustrated in FIGURES 4 and 5, the closure body 29 includes the strengthening rib 30 and the attaching means generally designated 31, as in the previously described form. This closure also includes the upstanding bead 32 and the floor portion 33, the latter being provided with a venting orifice at 34. In this form the cover disk 35 is bonded centrally to the floor portion at 36, said disk and floor portion being dished out of the normal planes in being brought together during the central bonding as illustrated in FIGURE 4, thus to yieldably hold the peripheral edge portion 37 of the disk against the upper extremity of the bead as a vapor pressure displaceable venting means. Also, the upward deformation of the floor portion 33, as indicated in FIGURE 4, provides a damming effect and a chamber which is deepest at the peripheral portion thereof. Any liquid seeping through the orifice 34, will be trapped in the chamber, and the floor portion 33 which might take on a messy appearance as the result of a liquid seepage will be hidden by the cover disk 35. Vapor venting into the chamber between the floor portion 33 and the cover disk 35 may escape by pressure displacement of peripheral edge portions 37 of the disk 35 from the supporting bead or rib 32, and the yieldable retention of the disk periphery against the bead will serve to trap a measure of vapor pressure which will be effective to minimize liquid seepage back through the orifice 34 into the cup. Also, as in the previously described form, the cover disk will prevent any objectionable outspilling of liquid which may have seeped into the closure chamber or compartment.

The condition of the closure disk 35 and the cooperating floor portion 33 prior to bonding of central portions thereof together as at 36 in FIGURE 4 is shown in FIGURE 5.

Figure 6:
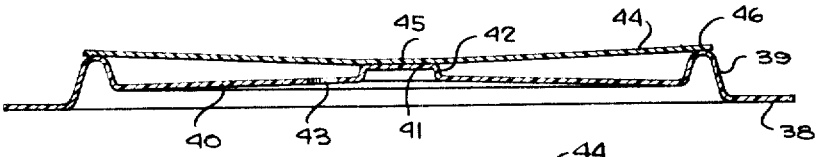
FIGURE 6 is a fragmentary sectional view illustrating another form of the invention.
Figure 7:
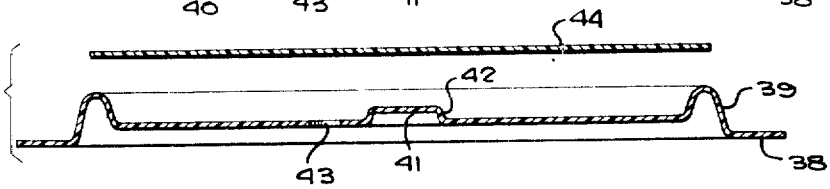
FIGURE 7 is a fragmentary sectional view similar to FIGURE 5 and showing the relation of the floor portion and the cooperating cover disk prior to attachment one to the other in the manner illustrated in FIGURE 6.

In the form of the invention shown in FIGURES 6 and 7 the closure body 38 includes the upstanding bead 39 and the floor portion 40 having the central raised portion 41 presenting the damming wall 42. The floor portion 40 also is equipped with a venting orifice at 43. As in the form of FIGURE 4, the cover disk 44 is bonded at 45 to a central portion of the floor portion, in this instance on the central raised portion 41, the peripheral edge of the disk resting upon the bead 39 and being displaceable in the manner and for the purpose described in connection with FIGURE 4.

The condition of the closure disk 44 and the cooperating floor portion 40 prior to the bonding thereof together centrally at 45 is shown in FIGURE 7.

Figure 8:
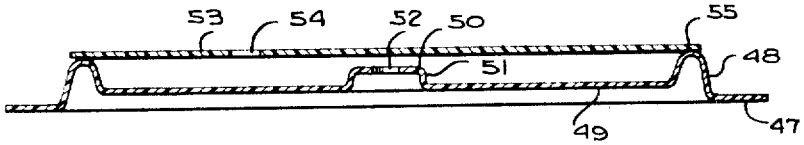
FIGURE 8 is a fragmentary sectional view illustrating another modification of the invention.
Figure 9:
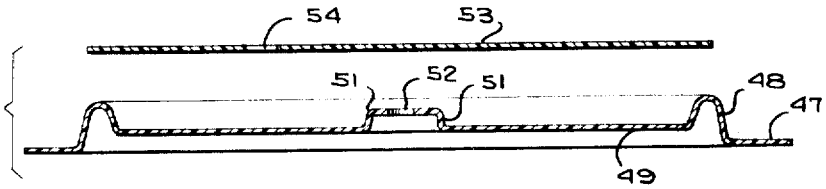
FIGURE 9 is a fragmentary sectional view showing the floor portion and cooperating cover disk of FIGURE 8 prior to attachment of the cover disk to the bead as shown in FIGURE 8.

In the form of the invention illustrated in FIGURES 8 and 9 the closure body 47 includes the upstanding bead 48 and the floor portion 49, the latter having a central raised portion 50 presenting a damming wall 51 and having a central venting orifice at 52. The cover disk 53 has a venting orifice at 54 and its peripheral margin is bonded at 55 to the upper extremity of the upstanding bead 48. As in the other forms, a vapor and seepage receiving chamber is provided between the floor portion 49 and the overlying cover disk 53, the cover disk serving to hide any messy appearance of the floor portion due to seepage of liquid into the chamber, and vapor venting being provided for at 52 and 54.

The condition of the floor portion 49 and the cooperating cover disk 53 prior to the bonding at 55 is shown in FIGURE 9.

Figure 10:
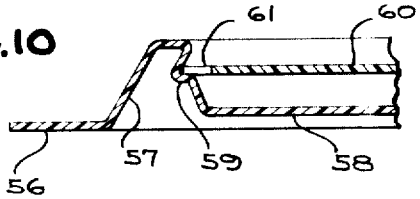
FIGURE 10 is a fragmentary sectional view illustrating another modification of the invention wherein the cover disk is snapped into receiving grooving in the bead and is edge notched to provide for vapor venting.

Another modification is illustrated in FIGURE 10, and in this form, the closure body 56 is equipped with a raised annular bead 57 as in the other forms, and the floor portion 58, vented in a manner similar to the other disclosures cooperates in a similar manner with an overlying cover disk in providing a compartment or chamber in the closure. In this form, the bead 57 may be provided with an annular seat 59 into which the peripheral edge of the cover disk 60 may be snapped for removable retention on the closure, and the peripheral edge of the cover disk may be notched as at 61 at one or more places in order to provide for the desired venting of vapors from the closure chamber.

As previously stated, the closure structures may be wholly formed of plastic, or the main body may be formed of plastic and cover disks of paper may be employed. In the bonding of the cover disks to the floor portion, or to particular portions, any suitable adhesive may be employed. Where heat sealable materials are used, the bonding may be by heat sealing, or where plastics are employed, volatile solvents may be employed in providing the desired bonding.

While preferred and alternative forms of the invention are disclosed herein, it is to be understood that additional structural modifications and part arrangements may be resorted to within the scope of the invention as defined in the appended claims.

I claim:

1. A closure of the character described comprising a disk-like body having means at its periphery for effecting attachment to a cup or other container and including an upstanding annular bead defining therewithin a floor portion and a chamber, a disk supported on said bead and closing over said chamber, means providing for ingress of vapor through the floor *portion* into the chamber from within a container on which the closure may be mounted and egress of vapor from said chamber past said disk to the atmosphere, the disk and bead having cooperating snap together disk retaining portions, and said snapped together disk retaining portions including means for vapor escape clearance.

2. A closure of the character described comprising a disk-like body having means at its periphery for effecting attachment to a cup or other container and including an upstanding annular bead defining therewithin a floor portion and a chamber, a disk supported on said bead and closing over said chamber, means providing for ingress of vapor through the floor into the chamber from within a container on which the closure may be mounted and egress of vapor from said chamber past said disk to the atmosphere, and said bead including a bead portion above said floor portion supporting the peripheral edge of the disk, and circumferentially spaced inwardly directed portions overlying said disk edge and retaining the same on said bead portion, and wherein the provision for egress of vapor from the chamber past the disk is by way of spacing between edge portions of the disk and the bead.

3. A closure of the character described comprising a disk-like body having means at its periphery for effecting attachment to a cup or other container and including an upstanding annular bead defining therewithin a floor portion and a chamber, a disk supported on said bead and closing over said chamber, means providing for ingress of vapor through the floor into the chamber from within a container on which the closure may be mounted and egress of vapor from said chamber past said disk to the atmosphere, and said bead including a bead portion above said floor portion supporting the peripheral edge of the disk, and circumferentially spaced inwardly directed portions overlying said disk edge and retaining the same on said bead portion, and wherein the provision for egress of vapor from the chamber past the disk is by way of indentions formed in the bead and spaced circumferentially thereabout and providing vapor outlets about edge portions of the disk.

4. A closure of the character described comprising a disk-like body having means at its periphery for effecting attachment to a cup or other container and includng an upstanding annular bead defining therewithin a floor portion and a chamber, a disk supported on said bead and closing over said chamber, means providing for ingress of vapor through the floor into the chamber from within a container on which the closure may be mounted and egress of vapor from said chamber past said disk to the atmosphere, and said bead including a bead portion above said floor portion supporting the peripheral edge of the disk, and circumferentially spaced inwardly directed portions overlying said disk edge and retaining the same on said bead portion, and wherein the floor includes an intermediate raised portion providing a seepage damming wall and spaced downwardly from the disk, the venting orificing of the floor being provided in said raised portion.

5. A closure of the character described comprising a disk-like body having means at its periphery for effecting attachment to a cup or other container and including an upstanding annular bead defining therewithin a floor portion and a chamber, a disk supported on said bead and closing over said chamber, means providing for ingress of vapor through the floor into the chamber from within a container on which the closure may be mounted and egress of vapor from said chamber past said disk to the atmosphere, and said bead including a bead portion above said floor portion supporting the peripheral edge of the disk, and circumferentially spaced inwardly directed portions overlying said disk edge and retaining the same on said bead portion, and wherein the floor includes an intermediate raised portion providing a seepage damming wall and spaced downwardly from the disk, the venting orificing of the floor being provided in said raised portion, and wherein the provision for egress of vapor from the chamber past the disk is by way of indentations formed in the bead and spaced circumferentially thereabout and providing vapor outlets about edge portions of the disk.

6. The closure as defined in claim 1 wherein said snap together disk retaining portions include circumferentially spaced inwardly directed portions overlying said disk edge and retaining the same on said bead.

*7. A closure of the character described comprising a disk-like body having means at its periphery for effecting attachment to a cup or other container and including an upstanding bead defining therewithin a floor portion, said upstanding bead being defined in part by inner and outer upstanding walls, said inner upstanding wall being joined to said floor portion, a disk disposed in generally overlying relationship to said floor portion, means providing for ingress of vapor through the floor portion into an area between the floor portion and the disk from within a container on which the closure may be mounted, means for the egress of vapor from said area past said disk to atmosphere, means for snap-securing a peripheral portion of said disk to said inner upstanding wall, and said vapor egress means being passage means defined between the periphery of said disk and said inner upstanding wall.*

*8. The closure as defined in claim 7 wherein said disk is an imperforate sheet material member.*

*9. The closure as defined in claim 7 wherein passage means is formed by at least a single passage in said inner upstanding wall opening radially inwardly toward a peripheral edge of said disk, and the axial length of said passage is greater than the thickness of said disk.*

*10. The closure as defined in claim 7 wherein said snap-securing means in an upper portion of said inner wall inclined radially inwardly into overlying relationship to the peripheral portion of said disk.*

References Cited

The following references, cited by the Examiner, are of record in the patented file of this patent or the original patent.

UNITED STATES PATENTS

| | | | |
|---|---|---|---|
| 1,529,246 | 3/1925 | Fern | 220—44 |
| 1,950,327 | 3/1934 | Punte | 220—44 |
| 1,954,748 | 4/1934 | Punte et al. | 220—44 |
| 2,027,137 | 1/1936 | Yeomans | 220—44 |
| 2,186,908 | 1/1940 | Page et al. | 215—56 XR |
| 2,242,966 | 5/1941 | Burkhardt | 215—56 |
| 2,263,969 | 11/1941 | Ingram | 220—44 |
| 2,296,848 | 9/1942 | Guefroy | 220—44 |
| 2,322,236 | 6/1943 | Ingram | 220—44 |
| 2,507,934 | 5/1950 | Reichart | 215—56 XR |
| 3,206,059 | 9/1965 | Fead et al. | 229—43 XR |

FOREIGN PATENTS

| | | |
|---|---|---|
| 376,213 | 7/1932 | Great Britain. |
| 308,527 | 7/1955 | Switzerland. |

DAVIS T. MOORHEAD, *Primary Examiner.*